US009734460B1

(12) United States Patent
Venkataraman et al.

(10) Patent No.: US 9,734,460 B1
(45) Date of Patent: Aug. 15, 2017

(54) ADJUSTING PARTICIPATION OF CONTENT IN A SELECTION PROCESS

(75) Inventors: Shivakumar Venkataraman, Santa Clara, CA (US); Ramakrishnan Srikant, Cupertino, CA (US); Anshul Kothari, Sunnyvale, CA (US); Aranyak Mehta, Mountain View, CA (US); Vivek Raghunathan, Fremont, CA (US); Nagbhushan Veerapaneni, Saratoga, CA (US); Abhishek Bapna, Hyderabad (IN); Adam Isaac Juda, New York, NY (US)

(73) Assignee: Google Inc., Mountain View, CA (US)

( * ) Notice: Subject to any disclaimer, the term of this patent is extended or adjusted under 35 U.S.C. 154(b) by 2204 days.

(21) Appl. No.: 12/478,241

(22) Filed: Jun. 4, 2009

Related U.S. Application Data

(60) Provisional application No. 61/061,495, filed on Jun. 13, 2008.

(51) Int. Cl.
*G06Q 10/00* (2012.01)
*G06Q 30/06* (2012.01)

(52) U.S. Cl.
CPC ......... *G06Q 10/00* (2013.01); *G06Q 30/0641* (2013.01)

(58) Field of Classification Search
USPC .......................................... 705/10
See application file for complete search history.

(56) References Cited

U.S. PATENT DOCUMENTS

| 2004/0107125 A1* | 6/2004 | Guheen | G06Q 99/00 |
| | | | 705/319 |
| 2005/0055275 A1* | 3/2005 | Newman | G06Q 30/02 |
| | | | 705/14.41 |
| 2009/0012848 A1* | 1/2009 | Brooks | G06Q 30/0201 |
| | | | 705/7.29 |

* cited by examiner

*Primary Examiner* — Garcia Ade
(74) *Attorney, Agent, or Firm* — Fish & Richardson P.C.

(57) ABSTRACT

Methods, systems, and apparatus, including computer program products, in which participation probabilities for content items in content item selection processes are adjusted based upon predicted performance measures. The predicted performance measures can be compared to one or more other predicted performance measures and/or threshold/scaling data to determine how to adjust the participation probability of the content item in the content item selection process.

26 Claims, 5 Drawing Sheets

ADJUSTING PARTICIPATION OF CONTENT IN A SELECTION PROCESS

CROSS-REFERENCE TO RELATED APPLICATION

This application claims the benefit under 35 U.S.C. §119(e) of U.S. Provisional Patent Application No. 61/061, 495, entitled "Adjusting Participation of Content in a Selection Process," filed Jun. 13, 2008, which is incorporated here by reference.

BACKGROUND

This document relates to content selection.

The rise of the Internet has enabled access to a wide variety of content items, e.g., video and/or audio files, web pages for particular subjects, news articles, etc. Such access to these content items has likewise enabled opportunities for targeted advertising. For example, content items of particular interest to a user can be identified by a search engine in response to a user query. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

Advertisers often set budgets for their advertising costs, and the same is true for advertising on the web. Unlike conventional print, television or radio advertising, the web provides variables as to how often an advertisement may be presented. In some online advertising systems, for example, advertisers pay for their advertisements on a per-action basis, e.g., a cost-per-click (CPC) basis. The CPC of an identified advertisement can be multiplied by a performance metric, e.g., a click-through rate (CTR), for the advertisement in an auction process. This multiplied value is thus proportional to the cost of advertisement presentation. Generally, the better the advertisements perform, the better the expected return on investment (ROI) for the advertiser.

However, the predicted performance of an advertisement can be variable between different instances of various placements. For example, if an advertisement is determined to be highly relevant to a first query, the predicted performance of the advertisement in such a placement may be very high. Conversely, if the advertisement is determined to be only marginally relevant to a second query, then the predicted performance of the advertisement in such a placement may be relatively low. Thus, an expected return on investment (ROI) for an advertisement or series of advertisements can depend, in part, on a predicted performance for each given selection process.

SUMMARY

In general, the subject matter of this application relates to adjusting a probability for submission of content items to a selection process based upon predicted performance measures of the content items in the selection process, e.g., based upon a comparison of the content item to alternative predicted performance measures or thresholds independent of an aggregate historical performance measure associated with the content item.

In general, one aspect of the subject matter described in this specification can be embodied in a method for throttling content items based on performance measures. The method can include the actions of obtaining a predicted performance measure of a content item that is eligible to be used in a content item selection process; comparing the predicted performance measure to one or more alternative predicted performance measures; adjusting a participation probability associated with the content item based on comparing the predicted performance measure to one or more alternative predicted performance measures, the participation probability identifying the probability that the content item will participate in the content item selection process; and determining whether to include the content item in the selection process based on the adjusted participation probability. Other embodiments of this aspect include corresponding methods, apparatus, and computer program products.

Various optional advantages and features can include increasing the ROI of a campaign by limiting the selection of advertisements having a predicted performance that is less than predicted performances of alternative advertisements and/or selection processes. Another optional advantage can include the comparison of the predicted performance of the advertisement to objective performance criteria to limit the presentation of the advertisement in selection processes where the predicted performance is low. Another optional advantage can include continuous scaling of the participation probability based upon the predicted performance relative to predicted performance of other advertisements and/or selection processes. These various optional advantages and features can be separately realized and need not present in any particular embodiment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

In general, the subject matter of this specification relates to adjusting a participation probability (e.g., impression probability) for submission of a content item (e.g., advertisement) to a selection process (e.g., automated auction) that is used to select the content items for presentation to a user. The participation probability can be based on a predicted performance measure of the content item, e.g., by comparing the predicted performance measure to a second performance measure or by comparing the predicted performance measure to a threshold independent of an aggregation of historical performance of the content item. The participation probability can also optionally be adjusted along a continuous spectrum of probabilities, the adjustment being proportional to a proximity of the predicted performance metric to the second predicted performance measure or to various thresholds. The participation probability can also be adjusted as a function of the predicted performance measure.

For example, if the content item is an advertisement, a predicted click-through rate of the advertisement for a property can be compared to click through rates for other properties to determine how to adjust a participation probability (e.g., impression probability) associated with the content item. The participation probability can be raised to increase the probability that the content item will participate in an auction for the property, or can be lowered to decrease the probability that the content item will participate in an auction for the property. In some implementations, the participation probability can be adjusted discretely through a range, e.g., from 0% to 100%. In other implementations, the participation probability can be adjusted continuously through the range.

Although various examples are described with reference to advertisements, the systems and methods described in this specification can also facilitate the identification and serving of other types of content items having measurable performance or quality parameters, such as videos, articles, reviews, etc.

Figure 1:
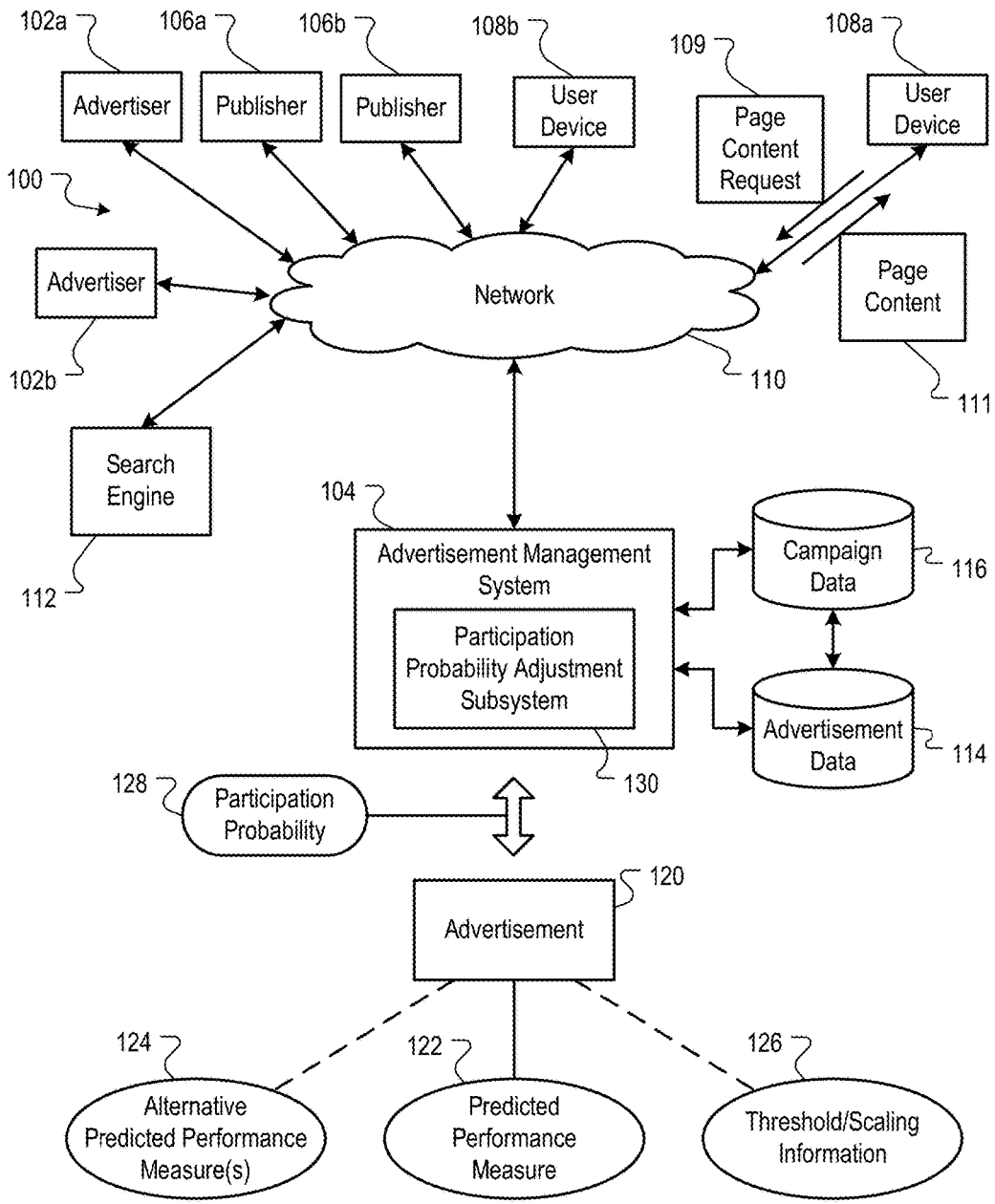
FIG. 1 is a block diagram of an example online environment.

The subject matter of this specification can be implemented in an online environment, such as the example online environment 100 shown in FIG. 1. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112. Although only two advertisers (102a and 102b), two publishers (102a and 102b) and two user devices (108a and 108b) are shown, the online environment 100 may include many thousands of advertisers, publishers and user devices.

§1.1 Advertisement Publishing and Tracking

In the online environment 100, one or more advertisers 102a and/or 102b can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement 120. The advertisements may also include embedded information, such as a links, meta-information, and/or machine executable instructions, such as HTML or JavaScript™.

A user device, such as user device 108a, can submit a page content request 109 to a publisher or the search engine 112. In some implementations, the page content 111 can be provided to the user device 108a in response to the request 109. The page content can include advertisements provided by the advertisement management system 104, or can include executable instructions, e.g., JavaScript™, that can be executed at the user device 108a to request advertisements from the advertisement management system 104. Example user devices 108 include personal computers, mobile communication devices, television set-top boxes, etc.

Advertisements can also be provided from the publishers 106. For example, one or more publishers 106a and/or 106b can submit advertisement requests for one or more advertisements to the system 104. The system 104 responds by sending the advertisements to the requesting publisher 106a or 106b for placement on one or more of the publisher's web properties (e.g., websites and other network-distributed content). The advertisements can include embedding links landing pages, e.g., pages on the advertisers 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 109 and advertisements can be sent to the user device 108 that requested the content (e.g., user device 108a) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106a and 106b can include general content servers that receive requests for content (e.g., articles, discussion threads, music, video, graphics, search results, web page listings, information feeds, etc.), and retrieves the requested content in response to the request. For example, content servers related news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, and other measurable performance metrics.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

§1.2 Advertisement Auctioning and Management

In addition to the advertisements being selected based on content such as a search query or web page content of a publisher, the advertisements can also be selected from other selection processes, such as an auction. In one implementation, the advertisement management system 104 includes an auction process. Advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The position, or rank, of an advertisement, such as where the advertisement is displayed next to search results or in which slot an advertisement will be displayed on a publisher page, can be a function of the cost-per-click multiplied by a quality score associated with the advertisement. A quality score can be the basis for measuring the quality and relevance of an advertisement. The quality score can, for example, be determined by the advertisement's click-through rate, the relevance of the advertisement text, overall historical keyword performance, and the user experience on a landing page associated with the advertisement. Other parameters can also be used to determine a quality score.

The rank of an advertisement that is displayed can be determined by multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

A: Rank=quality score×maximum cost-per-click=3.0×$0.50=1.50

B: Rank=quality score×maximum cost-per-click=1.0×$0.75=0.75

C: Rank=quality score×maximum cost-per-click=1.0×$1.00=1.00

The advertisers can be ranked as follows:
1. A
2. C
3. B

An advertisement can also be associated with an actual cost-per-click. The actual cost-per-click of the advertisement can be determined by the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give it a rank equal to the advertiser in position 2, and then the system 104 adds a unit amount, e.g., $0.01, to this determined amount.

To determine how much the advertiser in position 1 would have to pay to give it a rank equal to the advertiser in position 2, the rank of position 2 can be divided by the quality score of position 1 and $0.01 can be added to that amount. The last advertiser in the list can pay a minimum cost-per-click to hold the position in the list. The minimum cost-per-click can be determined for each advertisement, and can be based on quality of the advertisement. For example, suppose the minimum cost-per-click is $0.20. The actual cost-per-click of advertisers A, B, and C can be determined as follows:

A: C's rank/A's quality score=1.0/3=$0.33+$0.01=$0.34
C: B's rank/C's quality score=0.75/1=$0.75+$0.01=$0.76
B: minimum cost-per-click=$0.20

In this example, advertiser A would only have to pay $0.34 to hold the first position in the list of advertisements. C would have to pay $0.76 to hold the second position. Advertiser B would be required to pay the minimum cost-per-click amount of $0.20.

The advertisements, associated usage data, and bidding parameters described above can be stored as advertisement data in an advertisement data store 114. An advertiser 102 can further manage the serving of advertisement by specifying an advertising campaign. The advertising campaign can be stored in campaign data in a campaign data store 116, which can, for example, specify advertising budgets for advertisements, when, where and under what conditions particular advertisements may be served for presentation, etc. For example, a computer company may design an advertising campaign for a new laptop computer that is scheduled to be released on April 23. The advertising campaign may have an advertising budget of $100,000, and may have 30 different advertisements that are to be served for presentation during the month of April. Such data defining the advertisement campaign can be stored in the campaign data 116.

§2.0 Participation Probability Adjustment of Constrained Advertisements

An advertising budget can be managed in a variety of ways, such as specifying a daily advertising budget. Furthermore, each advertiser typically desires to increase the ROI of an advertisement or campaign. Thus, in an implementation, the advertising system 104 can include a participation probability adjustment subsystem 130.

The participation probability adjustment subsystem 130 can evaluate the advertisement usage data stored in the advertisement data store 114 to determine various performance measures of an advertisement 120 or related campaign. Based on such evaluations, a predicted performance measure 122 can be determined. In some implementations, the predicted performance measure 122 can be on a per-advertisement basis, e.g., a historical click-through rate of an advertisement, or a historical conversion rate associated with an advertisement, or some combination of these historical rates and/or other rates.

In addition to the predicted performance measure 122 associated with the advertisement 120, in some implementations, participation probability adjustment subsystem 130 can evaluate advertisement data in the advertisement data store 114 to determine alternative predicted performance measures (e.g., one or more second predicted performance measures) of the advertisement 120 in other instances of content item selection processes. Based on such evaluations, alternative predicted performance measures 124 can be determined. In some implementations, the alternative predicted performance measures can be on a per-campaign basis, e.g., a historical click-through rate of an advertisement, or a historical conversion rate associated with an advertisement, or some combination of these historical rates and/or other rates.

In some implementations, the predicted performance measure 122 can be compared to the alternative predicted performance measure 124. Such comparison can provide a relative view of the predicted performance of the advertisement 120 with respect to other instances of content item selection processes.

In other implementations, the predicted performance measure 122 can be compared to threshold/scaling information 126. The threshold/scaling information can identify thresholds or scales to which the predicted performance measure 122 can be compared to identify whether the predicted performance of the advertisement meets defined standards or scales.

§2.1 Participation Probability Adjustment Based on Predicted Discount

In some implementations, the participation probability 128 of the advertisement 120 in a selection process can be based upon a predicted discount. In such implementations, the predicted performance measure 122 of the advertisement 120 can include a predicted discount. The predicted discount can be defined by the difference between a predicted slot price for a first selection process and the maximum bid associated with the advertisement 120. In those implementations using an alternative predicted performance measure 124, the predicted performance measure 122 can be compared to the one or more alternative predicted performance measures 124 to derive participation probability 128 of the advertisement 120 in the selection process and/or the participation probability in the one or more other selection process(es) associated with the alternative predicted performance measure(s) 124. In those implementations using threshold/scaling information 126, the predicted performance measure 122 can be compared to a threshold/scaling information 126 to derive a participation probability 128 for the advertisement 120 in a content item selection process. Comparison of the predicted performance measure 122 to the threshold/scaling information 126 and/or alternative predicted performance measure(s) 124 can identify the relative discount for the current selection process on a spectrum (e.g., continuous or discrete) of expected discounts from other auctions.

In one example, a first auction for which the advertisement 120 is eligible to participate might be expected to draw a price of $1.00, and the advertisement 120 maximum bid is $2.50. Therefore, the expected discount for the advertisement 120 in the auction is $1.50. In the same example, a second auction for which the advertisement 120 is eligible to participate might be expected to draw a price of $0.85, and the advertisement 120 maximum bid is $2.50. Therefore, the expected discount is $1.65. Because the expected discount for the advertisement 120 in the second auction is greater than the expected discount for the advertisement 120 in the first auction, it can be presumed that the advertiser would prefer to participate in the second auction. The participation probability 128 for advertisement 120 to participate in the first auction can be lowered, e.g., to 20%, and/or the participation probability 128 for the advertisement 120 to participation in the second auction can be raised, e.g., to 80%.

In another example, if the estimated price for an advertisement slot during an auction is $1.00, and the maximum bid associated with the advertisement 120 is $1.50. Thus, the expected discount for the advertisement participating in the auction is $0.50 or 33.3%. The expected discount can be compared to threshold/scaling information 126 to derive a participation probability 128. The comparison of the predicted performance probability to the threshold/scaling information 126 can identify a significance of the discount of this auction with respect to a spectrum or range of discounts for all auctions. In some implementations, the function defining the participation probability 128 can be defined by discrete ranges. Depending on which of the discrete ranges in which the expected discount exists, the participation probability 128 is a defined percentage. For example, if a discount is 0-20% the participation probability can be defined as 20%, if the discount is 20%-40% the participation probability can be defined as 50%, and if the discount is above 40% the participation probability can be defined as 80%. In those implementations, that define a continuous distribution of discounts, the participation probability can be defined as a function of the discount value.

In some implementations, the participation probability can be predetermined by policy. For example, an administrator/advertiser might indicate that a constrained advertisement 120 should participate in auctions where the predicted performance measure 122 is high with a probability of 80%, and participate in auctions where the predicted performance measure 122 is low with a probability of 20%. Other percentages for the prediction probabilities 128 can be used. In other implementations, a value of the participation probability can be based upon a function which adjusts the participation probability based upon a relative difference between the predicted performance measure 122 and other performance measures 124 and/or thresholds.

§2.2 Participation Probability Adjustment Based on Expected Revenue Contribution In some implementations, the participation probability 128 can be based on an expected revenue contribution of the advertisement 120 to the content item selection process. In such implementations, the predicted performance measure 122 of the advertisement 120 can be the expected revenue contribution of the advertisement 120 to the selection process. In those implementations using alternative predicted performance measures 124, the one or more alternative predicted performance measures 124 can be based upon an expected revenue contribution of the advertisement in other content item selection processes, and the predicted performance measure 122 can be compared to the one or more alternative predicted performance measures 124. In those implementations using threshold/scaling information 126, the predicted performance measure 122 can be compared to threshold/scaling information 126 to identify a relative revenue contribution for the current selection process compared to a spectrum (e.g., continuous or discrete) of expected revenue contributions for all auctions. In such implementations, a participation probability 128 of the advertisement 120 in the selection process can be raised or lowered based upon the comparison. In those implementations where the predicted performance measure 122 is compared to threshold/scaling information 126, the participation probability 128 of the advertisement 120 in the selection process can be adjusted based upon where the predicted performance measure 122 exists with respect to the threshold/scaling information 126.

In one example, a first auction for which the advertisement 120 is eligible to participate might expected to draw a price of $3.40 without the participation of the advertisement 120, and would be expected to draw a price of $3.45 including the participation of the advertisement. Therefore, the expected contribution of the advertisement 120 to the first auction is $0.05, or 1.47%. In the same example, a second auction for which the advertisement is eligible might be expected to draw a price of $0.85 without the participation of the advertisement 120, and would be expected to draw a prices of $1.15 including the advertisement 120. Therefore, the expected revenue contribution of the advertisement 120 to the second auction is $0.30, or 35.3%. Because the expected revenue contribution of the advertisement 120 in the second auction is greater than the expected revenue contribution of the advertisement 120 in the first auction, it can be presumed that the advertisement 120 is more likely to win the second auction. Moreover, it is more beneficial for the advertisement 120 to participate in auctions that it is more likely to win. Thus, a first participation probability 128 with respect to the first auction can be lowered (e.g., to 20%), while a second participation probability 128 with respect to the second auction can be raised (e.g., to 80%). Such adjustment of participation probability 128 can facilitate preferred participation in weaker auctions, thereby strengthening the auction while providing better opportunity for advertising placements to advertisers.

In another example, a first auction for which the advertisement 120 is eligible to participate might expected to draw a price of $2.30 without the participation of the advertisement 120, and would be expected to draw a price of $2.40 including the participation of the advertisement. The expected contribution of the advertisement to the auction is $0.10 or 4.35%. In some implementations, the threshold/scaling information 126 can be provided in percentage contribution. In other implementations, the threshold/scaling information 126 can be provided in monetary terms (e.g., currency value). Returning to the example above, the threshold/scaling information might indicate that an expected contribution of less than 10% results in adjustment of the participation probability 128 to 20%, while an expected contribution of greater than 30% results in adjustment of the participation probability 128 to 80%. In this example, because the expected contribution of 4.35% is less than 10%, the participation probability 128 of the advertisement 120 in the auction can be lowered to 20%. Thus, the advertisement 120 has a 20% chance of participating in the auction.

In some implementations, the threshold/scaling information 126 can define a continuous distribution, whereby a continuous function can be used to adjust the participation probability. One function that can be used with respect to the above example might be a logarithmic function of the contribution percentage with a limit of 1.0 (100%).

§2.3 Participation Probability Adjustment Based on Number of Competitors

In some implementations, the participation probability 128 of the advertisement 120 in a content item selection process can be based upon a number of competitors in the content item selection process. In such implementations, the predicted performance measure 122 of the advertisement 120 can include a predicted number of competitors in the content item selection process. Generally, advertisers would like to participate in less populous auctions. In those implementations using an alternative predicted performance measure 124, the predicted performance measure 122 can be compared to the one or more alternative predicted performance measures 124 to derive participation probability 128 of the advertisement 120 in the selection process and/or the participation probability in the one or more other content item selection process(es) associated with the alternative predicted performance measure(s) 124. In those implementations using threshold/scaling information 126, the predicted performance measure 122 can be compared to threshold/scaling information 126 to derive a participation probability 128 for the advertisement 120 in a content item selection process.

In one example, the number of predicted participants for an auction might be 22. The number of predicted participants can be compared to threshold/scaling information 126 to derive a participation probability 128. The comparison of the predicted performance probability to the threshold/scaling information 126 can identify a significance of the number of predicted participants in the auction with respect to a spectrum or range of participation for all auctions. In some implementations, the function defining the participation probability 128 for the advertisement 120 can be defined by discrete ranges. Depending on which of the discrete ranges in which the predicted participation exists, the participation probability 128 is a predefined percentage. For example, if a predicted participation is over 20 the participation probability can be defined as 20%, if the predicted participation is under 20 the participation probability can be defined as 80%. In those implementations, that define a continuous distribution of predicted participation, the participation probability can be defined as a function of the predicted number of participants in the auction. Other participation probability assignments can be used.

In another example, a first auction for which the advertisement 120 is eligible to participate might predicted to draw 22 participants, while a second auction for which the advertisement 120 is eligible to participate might be predicted to draw 6 participants. Therefore, the second auction is presumed to be less competitive than the first auction. Because the second auction is expected to be less competitive than the first auction, the participation probability 128 for advertisement 120 in the first auction can be set at a low level (e.g., 20%) and/or the participation probability 128 of the advertisement 120 in the second auction can be set at a high level (e.g., 80%). Other participation probability assignments can be used.

§2.4 Participation Probability Adjustment Based on Number of Unconstrained Competitors In other implementations, the participation probability 128 of the advertisement 120 in a content item selection process can be based more particularly upon a number of unconstrained participants predicted to be participating in the content item selection process. In such implementations, the participation probability 128 for the advertisement 120 in the content item selection process can be assigned based upon the number of unconstrained participants in the content item selection process. For example, content item selection processes that include a large number of unconstrained competitors are more likely to be more competitive than content item selection processes with a lower number of unconstrained competitors. Thus, the participation probability 128 can be set to favor participation of the advertisement 120 in content item selection processes in which the number of unconstrained competitors is low.

Basing the participation probability of the on the number of competitors (constrained or unconstrained) in the content item selection process can help to facilitate healthy auctions with a more uniform level of participation by eligible advertisements.

§2.5 Participation Probability Adjustment Based on Time of Day

The predicted performance of advertisements 120 can differ based upon the time of the day, because the number of people on the web as well as their focus on advertisements 120 varies throughout the day. Thus, in some implementations, the participation probability 128 of the advertisement 120 in the content item selection process can be based on the time of day during which the content item selection process occurs. In such implementations, the predicted performance measure 122 of the advertisement 120 can include a time of day. The predicted performance measure 122 including the current time of day can be compared against threshold/scaling information 126 to derive a participation probability 128 for the advertisement 120 participation in the content item selection process.

For example, more people are generally on the web during business hours than at 3:00 am. Thus, the participation probability 128 of the advertisement 120 can be raised during the hours of 8:00 am until 6:00 pm, and lowered during the hours of 6:00 pm until 8:00 am. In some examples, the participation probability 128 can be raised to 80%, during the hours from 8:00 am until 6:00 pm, and can be lowered to 20% during the hours from 6:00 pm until 8:00 am. Other percentages and or hour ranges can be used. Moreover, in some examples, there might exist several different participation probabilities 128 based upon the time of day.

In some implementations, the participation probability 128 can be adjusted for each hour, minute, and/or second of the day. For example, the participation probability adjustment subsystem 130 can map out the performance of advertisements over the course of a day and identify the best times to serve an advertisement on a continuous scale over the time of day. In such examples, the predicted performance measure 122 of an advertisement might vary by minute or second, and the participation probability can be assigned to the advertisement based upon the time at which the content item selection process begins.

In some implementations, the predicted performance measure 122 including the time of day can be compared to one or more alternative predicted performance measures 124 to derive a participation probability 128. For example, if the predicted performance measure 122 indicates that an advertisement 120 has a CTR of 20% in a first auction during the hours of gam-11:30 am, and the alternative predicted performance measure 124 indicates that the advertisement 120 has a CTR of 40% in another auction during the hours of 9 am-12:00 pm, the advertiser is presumed to prefer that the advertisement 120 participate in the second auction over the first auction. Thus, a participation probability for the first auction, e.g., can be lowered to 20%, and/or the participation probability 128 for the second auction, e.g., can be raised to 80%. In such an example, the advertisement 120 has an 80% chance of participating in the second auction and/or a 20% chance of participating in the first auction. Other percentages and thresholds can be used.

§2.6 Participation Probability Adjustment Based on Geographical Location

In some implementations, the predicted performance measure 122 of the advertisement 120 can be based upon geographical location of a user to which the advertisement is to be served (e.g., a location of a user that originated a search query). The predicted performance measure 122 can differ based upon the location of the viewer of the advertiser. Thus, the predicted performance measure 122 including the geographic location in which it is to be served can be compared against threshold/scaling information 126 to derive a participation probability 128 for the advertisement 120 participation in the content item selection process.

For example, when a user queries restaurants, the user is more likely to be looking for restaurants in his/her geographic area than other areas. As such, it would unhelpful for the user or for the advertiser to serve an advertisement 120 for a advertiser restaurant that is outside of the user's geographic region. In such examples, the participation probability 128 of the advertisement 120 can be raised if the advertiser is within a threshold distance from the user, and can be lowered if the advertiser is outside of the threshold distance from the user. Thus, the participation probability 128 can be raised to 80%, for example, for advertisements 120 associated with a location within, e.g., 25 miles of the user, and can be lowered to 20%, for example, for advertisements 120 associated with a location outside of, e.g., 25 miles of the user. In other examples, there might exist several different participation probabilities 128 based upon different distances. For example, one can envision concentric circles spreading out from the location of the user and defining participation probabilities within each circle.

In some implementations, the participation probability 128 can be adjusted for each distance value. For example, the participation probability adjustment subsystem 130 can map out the performance of advertisements 120 over the geographic distances and identify many participation probabilities 128 for an advertisement 120 on a continuous scale over the all geographic distances. In such examples, the predicted performance measure 122 of an advertisement might vary by each mile or foot (kilometer or meter) of distance from the user, and the participation probability 128 can be assigned to the advertisement 120 based upon the exact location of the user initiating the content item selection process.

In some implementations, the predicted performance measure 122 including the geographical location can be compared to one or more alternative predicted performance measures 124 to derive a participation probability 128. For example, if the predicted performance measure 122 indicates that the advertisement 120 is associated with a geographical distance of 3 miles from a first user initiating a first auction, and the alternative predicted performance measure 124 indicates that the advertisement 120 is associated with a geographical distance of 100 miles from a second user initiating a second auction, the advertiser is presumed to prefer that the advertisement 120 participate in the first auction over the second auction. Thus, a participation probability for the first auction, e.g., can be raise to 80%, and/or the participation probability 128 for the second auction, e.g., can be lowered to 20%. In such an example, the advertisement 120 has an 80% chance of participating in the first auction and/or a 20% chance of participating in the second auction. Other percentages and thresholds can be used.

§2.7 Participation Probability Adjustment Based on Web Property Attributes

In some implementations, the predicted performance measure 122 of the advertisement 120 can be based upon attributes of the web property. The attributes of the property can be defined by performance of the advertisement 120 on a particular property. In those implementations using threshold/scaling information 126, the predicted performance measure 122 can be compared to a threshold/scaling information 126 to derive a participation probability 128 for the advertisement 120 in a content item selection process. Comparison of the predicted performance measure 122 to the threshold/scaling information 126 can identify the relative performance of the advertisement 120 on a property associated with the content item selection process. The relative performance can be plotted on a spectrum (e.g., continuous or discrete) of expected performance versus performance of the advertisement 120 on other properties. In those implementations using one or more alternative predicted performance measures 124, the predicted performance measure 122 can be compared to the one or more alternative predicted performance measures 124 to derive participation probability 128 of the advertisement 120 in the selection process and/or the participation probability in the one or more other content items selection process(es) associated with the alternative predicted performance measure(s) 124.

In one example, if the advertisement 120 has a CTR of 20%, the predicted CTR can be compared to threshold/scaling information 126 to derive a participation probability 128. The comparison of the predicted performance probability to the threshold/scaling information 126 can identify a significance of the CTR of this property with respect to a spectrum or range of expected CTRs for other auctions. In some implementations, the function defining the participation probability 128 can be defined by discrete ranges or by a continuous spectrum of participation probabilities 128.

In another example, a first auction for which the advertisement 120 is eligible to participate might expected to have a CTR of 25%. In the same example, a second auction for which the advertisement 120 is eligible to participate might have a predicted CTR of 10%. Because the predicted performance measure 122 for the advertisement 120 in the first auction is greater than the alternative predicted performance measure 124 of the advertisement 120 in the second auction, the participation probability 128 of the advertisement 120 for the first auction can be raised, e.g., to 80%, and/or the participation probability 128 of the advertisement 120 for the second auction can be lowered, e.g., to 20%. Thus, the advertisement 120 is more likely to be placed on properties that provide better performance for the advertisement.

§2.8 Participation Probability Adjustment Based on Campaign Budget Comparison

In some implementations, the predicted performance measure 122 of the advertisement 120 can be based upon a likelihood that a current campaign budget including the budget for the advertisement 120 will be exhausted. In such implementations, the predicted performance measure 122 can be compared to an alternative predicted performance measure 124 associated with the same advertiser. The alternative predicted performance measure 124 can identify the likelihood that an alternative campaign budget associated with a different campaign run by the same advertiser will be exhausted. Based upon the comparison of the likelihood that the current campaign budget will be exhausted versus the likelihood that the alternative campaign budget will be exhausted, the participation probability 128 for the advertisement 120 in the content item selection process can be reduced and/or a participation probability associated with participation of an alternative advertisement in the content item selection process can be raised.

For example, a first advertisement eligible for an auction might be associated with a first campaign run by an advertiser and have an 80% probability of exhausting a first campaign budget for the first campaign. A second advertisement eligible for the auction might be associated with a second campaign run by the advertiser might have a 10% chance of exhausting a second campaign budget for the second campaign. Because the first advertisement is more likely to exhaust the first campaign budget, the participation probability of the first advertisement can be adjusted to reduce the probability that the first advertisement will participate in the auction and/or the participation probability of the second advertisement can be adjusted to raise the probability that the second advertisement will participate in the auction.

In some implementations, the predicted performance measure 122 including the probability that the campaign budget will be exhausted can be compared to threshold/scaling information 124 to derive a participation probability 128. For example, if the predicted performance measure 122 indicates that an advertisement 120 has a 75% likelihood of exhausting it's budget, the advertisement 120 can be throttled to conserve advertising budget to last throughout the day. Thus, when the budget is expected to be exhausted, a participation probability for the advertisement 120 in a content item selection process, e.g., can be lowered to 20%. In other examples, where the budget is not expected to be exhausted (e.g., under 50% probability of being exhausted), the participation probability 128 for the advertisement 120 in a content item selection process, e.g., can be raised to 80%.

§2.9 Participation Probability Adjustment Based on Match Type

In some implementations, the predicted performance measure 122 of the advertisement 120 can be based upon a match type of keywords associated with the advertisement to terms included in a search query initiating the content item selection process. The performance of an advertisement can be based upon how well the advertisement matches a search query. For example, if a user enters a search query for "hot dogs" it is unlikely that an advertisement for a sausage will be selected by the user if presented.

In such implementations, the predicted performance measure 122 including a match type can be compared against threshold/scaling information 126 to derive a participation probability 128 for the advertisement 120 participation in the content item selection process. Thus, advertisements 120 with keywords that are identical matches to the search query can be assigned a participation probability 128 that increases the likelihood that the advertisement 120 will participate in the content item selection process. Likewise, advertisements which are only broad matches (e.g., less than identical) to the search query for the can be assigned a participation probability 128 that decreases the likelihood that the advertisement 120 will participate in the content item selection process. In various implementations, there can exist several different participation probabilities 128 based upon several different types of match types defined by the participation probability adjustment subsystem 130.

§2.10 Participation Probability Adjustment Based on Edit Distance

In other implementations, the participation probability 128 can vary based upon an edit distance between keywords associated with an advertisement 120 and a search query initiating the content item selection process. In such implementations, the predicted performance measure 122 is based upon the edit distance between the advertisement 120 keywords and the search query initiating the content item selection process. Advertisements 120 having keywords with a relatively short edit distance to the search query can be assigned a participation probability 128 that increases the likelihood that the advertisement 120 will participate in the content item selection process. Likewise, advertisements 120 having keywords with a relatively long edit distance to the search query can be assigned a participation probability 128 that decreases the likelihood that the advertisement 120 will participate in the content item selection process. In various implementations, there may be several threshold ranges into which the edit distance can fall. A participation probability 128 can be assigned dependant on the particular range into which the edit distance falls.

In other implementations, a distribution of edit distances can be defined, and each edit distance in the distribution can be associated with a particular participation probability 128. Thus, the participation probability adjustment subsystem 130 can identify the participation probability 128 responsive to the distribution and the associated probabilities.

§2.11 Participation Probability Adjustment Based on Similarity of Verticals

In some implementations, the participation probability 128 can vary based upon similarity of an advertisement vertical to a vertical associated with the search query. In some implementations, the vertical of the advertisement 120 can be defined by the advertiser, and the vertical for the search query can be defined, for example, based upon the characteristics of the query without collecting information about the user. In such implementations, the predicted performance measure 122 is based upon the similarity of the vertical of the advertisement and the vertical of the search query. Advertisements 120 associated with a vertical that is similar to the vertical of the search query can be assigned a participation probability 128 that increases the likelihood that the advertisement 120 will participate in the content item selection process. Likewise, advertisements 120 associated with a vertical that is dissimilar to a vertical associated with the search query can be assigned a participation probability 128 that decreases the likelihood that the advertisement 120 will participate in the content item selection process. In various implementations, there may be degrees of similarity defined for verticals and participation probabilities can be assigned based upon the degree of similarity between the vertical for the advertisement 120 and the vertical for the search query.

In some implementations, the vertical of the user can be identified based upon probabilities associated with the search terms included in the query. Query logs can be examined to identify query paths associated with similar queries and the likelihood that the user is searching for one category of results over another category of results. For example, the search query "hot dog vendor" can be analyzed to identify a probable vertical associated with the query. Based upon the search terms, it can be presumed that the user is relatively close to a low-cost restaurant consumer vertical, while the vertical of the search query is not very close to a high-end restaurant consumer vertical, or a restaurant supply vertical. Thus, advertisements 120 that are eligible to participate in the content item selection process initiated by the search query that are in a low-cost restaurant vertical can be assigned a higher participation probability 128 than advertisements 120 associated with a restaurant supply vertical or a high-end restaurant consumer vertical.

In some implementations, in order to protect the privacy of users, such analysis might occur only with permission to analyze the vertical of the search query. Such permission, for example, can be express based on providing the user an option to allow the advertisement management system 104 to analyze the vertical to provide better targeting for sponsored content.

§2.12 Participation Probability Adjustment Based on Similarity of Demographics

In some implementations, the participation probability 128 can vary based upon demographics associated with a user submitting the search query. In some implementations, a target demographic for the advertisement 120 can be defined by the advertiser, and the demographic of a user associated with search query can be defined, for example, based upon the characteristics of the query without collecting information about the particular user submitting the query. In such implementations, the predicted performance measure 122 is based upon the similarity of the target demographic for the advertisement 120 and the demographic characteristics of the search query. Advertisements 120 associated with a target demographic that is similar to the demographic characteristic of the search query can be assigned a participation probability 128 that increases the likelihood that the advertisement 120 will participate in the content item selection process. Likewise, advertisements 120 associated with a target demographic that is dissimilar to a demographic characteristic of the search query can be assigned a participation probability 128 that decreases the likelihood that the advertisement 120 will participate in the content item selection process. In various implementations, there may be degrees of similarity defined for the target demographics/query demographics and participation probabilities can be assigned based upon the degree of similarity between the target demographic for the advertisement 120 and the demographic characteristics of the search query.

In some implementations, the demographic of the user can be identified based upon the particular search terms included in the query. Query logs can be examined to identify search terms which are indicative of gender or age group. For example, the search query "skater video game" can be analyzed to identify a probable demographic associated with the query. Based upon the search terms, it can be presumed that the search query is associated with a male demographic 13-25 years of age. Thus, advertisements 120 that are eligible to participate in the content item selection process initiated by the search query that have a target demographic similar to the demographic characteristics associated with the search query (e.g., male under 25) can be assigned a higher participation probability (e.g., 80%) than advertisements 120 that are eligible to participate in the content item selection process which have a target demographic (e.g., male over 30) which is dissimilar to the demographic characteristics of the search query.

In some implementations, in order to protect the privacy of users, such analysis occurs only with permission to analyze the demographic of the user based upon the search query and/or session history. Such permission, for example, can be express based on providing the user an option to allow the advertisement management system 104 to analyze the search query and/or session to provide better targeting for sponsored content.

In various implementations, the participation probability 128 can be based on any combination of the predicted performance measures 122 described above. For example, the participation probability 128 can be based on a combination of the time of day and number of participants in a content item selection process.

§3.0 Participation Probability Adjustment Subsystem

Figure 2:
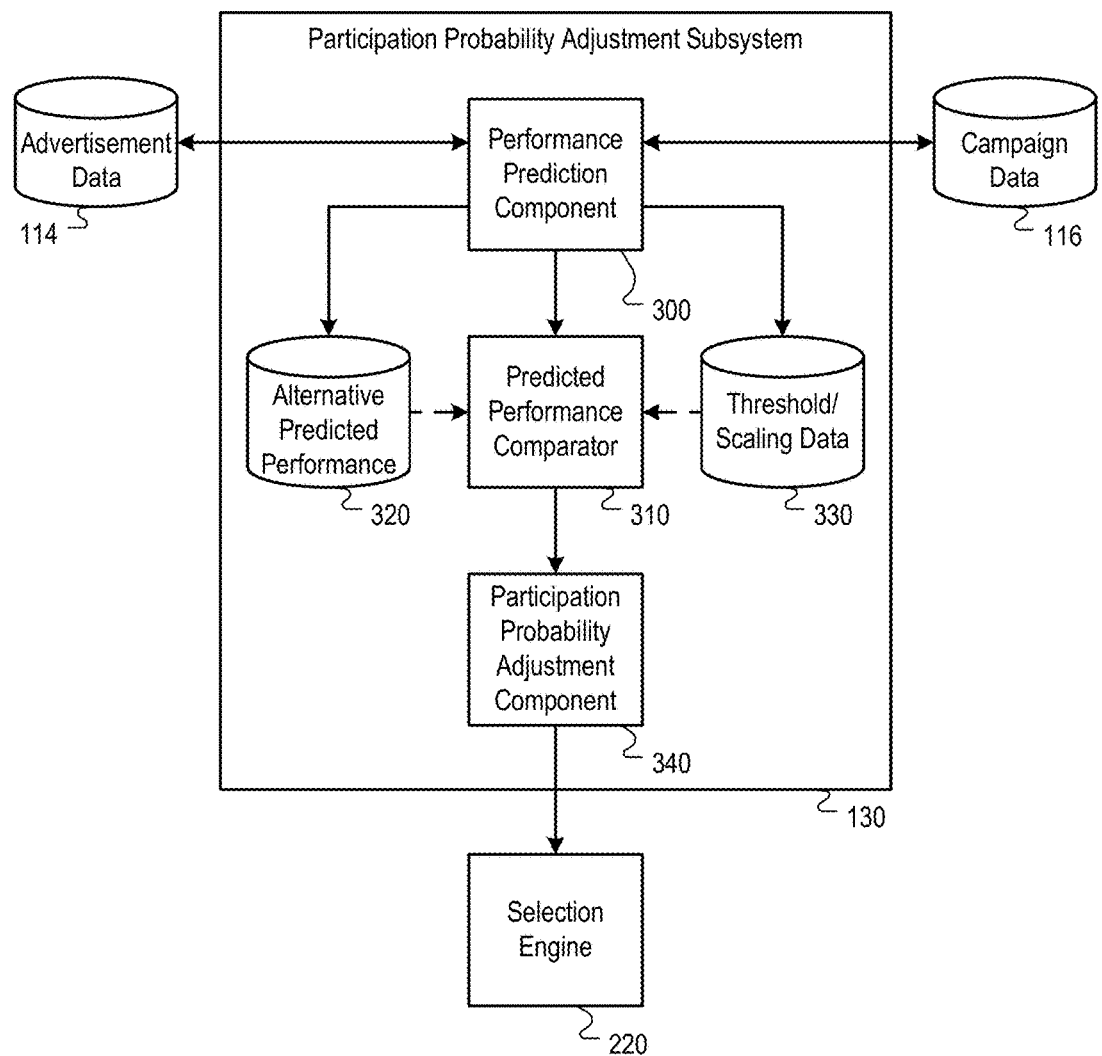
FIG. 2 is a block diagram of an example participation probability adjustment subsystem.

FIG. 2 is a block diagram of an example participation probability adjustment subsystem 130. The participation probability adjustment subsystem 130 can include a performance prediction component 300, a predicted performance comparator 310, an alternative predicted performance data store 320, a threshold/scaling data store 330, and a participation probability adjustment component 340. In some implementations, the performance prediction component 300 can analyze advertisement data from an advertisement data store 114 and campaign data from a campaign data store 116. The analysis of the advertisement and campaign data can provide a predicted performance measure for the advertisement. In various implementations, the predicted performance can be based upon historical CTR, time of day, bidding information, budget information, budget information, predicted number of participants (e.g., constrained, unconstrained, or combinations thereof) in the auction, attributes of the property, expected impact of the content item on the selection process, probable discount price of the slot compared to a maximum bid, target demographic similarity to a query demographic, match type of keywords to a search query, an edit distance between keywords and terms of a search query, similarity of an advertisement vertical to a query vertical, a geographic distance between the advertiser and a user, etc.

In some implementations, the performance prediction component 300 can also analyze alternative advertisements and/or selection processes to identify alternative predicted performance data and store the alternative predicted performance data to an alternative predicted performance data store 320. The alternative predicted performance data can include prediction data that matches the predicted performance data associated with the advertisement. For example, if the performance prediction data included a time of day and a campaign budget, the alternative prediction data can include a time of day and a campaign budget. Similar categories of predicted performance data and alternative predicted performance data can provide a meaningful comparison to be used in adjusting a participation probability.

In some implementations, the performance prediction component 300 can also analyze predicted performance data to identify threshold/scaling data and can store the threshold/scaling data to a threshold/scaling data store 330. The threshold/scaling data can be provided for data types that match the predicted performance data associated with the advertisement. In some implementations, the threshold/scaling data can be derived based upon past predictions of performance of the advertisement. In other implementations, the threshold/scaling data can be derived based upon historical performance of the advertisement in previous selection processes. In still further implementations, the threshold/scaling data can be derived based upon historical performance of all advertisements or related advertisements (e.g., advertisements in the campaign).

The predicted performance data can be provided to the predicted performance comparator 310. In various implementations, the predicted performance comparator 310 can compare the predicted performance data provided by the performance prediction component 300 to alternative predicted performance data received from the alternative predicted performance data store 320 and/or threshold/scaling data provided by the threshold/scaling data store 330. The results of the comparison can be provided to a participation probability adjustment component 340.

In some implementations, the participation probability adjustment component 340 determine whether an adjustment should be made to a participation probability associated with the advertisement based upon comparison information received from the predicted performance comparator 310. In further implementations, the participation probability adjustment component 340 can identify the adjustment to be made to the participation probability if it is determined that an adjustment should be made. In some examples, the participation probability for the advertisement in the selection process can be increased if the comparison indicates that the advertisement is predicted to perform better than other advertisements and/or selection processes. In other examples, the participation probability for the advertisement in the selection process can be decreased if the comparison indicates that the advertisement is predicted to perform worse than other advertisements and/or selection processes.

The participation probability can be provided to a selection engine 220. In some implementations, the selection engine can select which of the advertisements will participate in the selection process. All eligible unconstrained advertisements can participate in the selection process. In some examples, a constrained advertisement can be selected based upon identification of a random or pseudo-random number between zero and 100, which can be compared to the participation probability percentage of the constrained advertisement. If the random or pseudo-random number is below the participation probability percentage, the constrained advertisement can participate in the selection process. Otherwise, the constrained advertisement is excluded. Other selection mechanisms for constrained advertisements can be used.

§4.0 Example Participation Probability Adjustment Processes

Figure 3A:
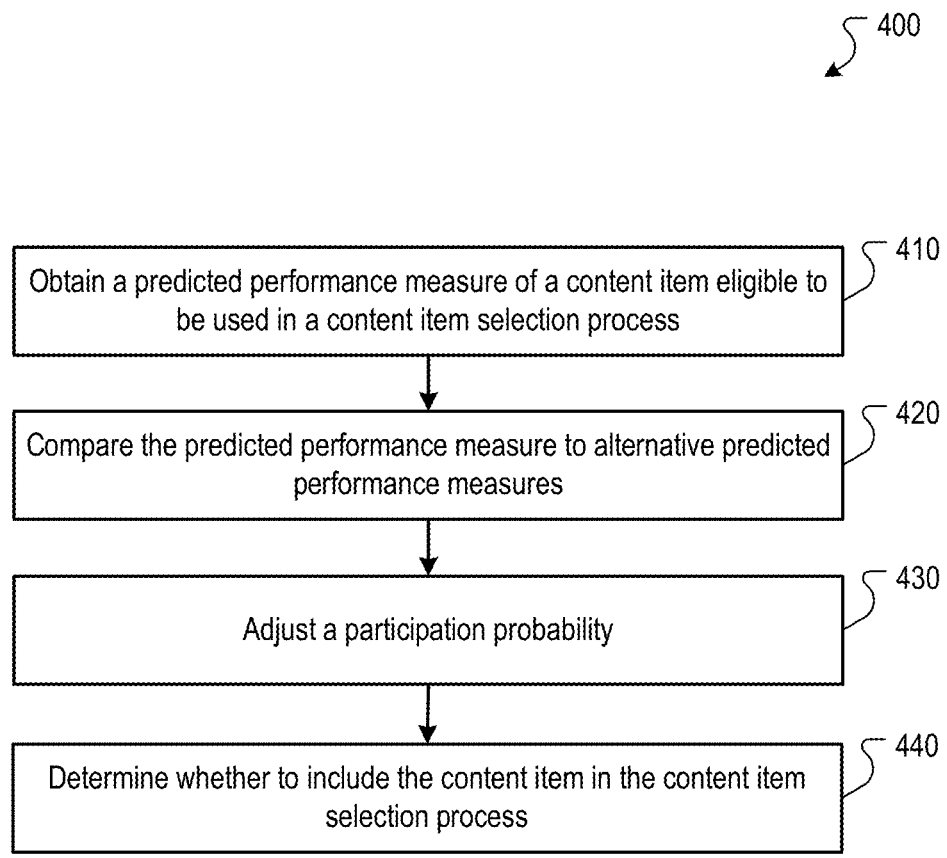
FIGS. 3A-B are flow diagrams of example processes for adjusting participation probability for a content item in a content item selection process.

FIG. 3A is a flow diagram of an example process 400 for participation probability adjustment based on predicted performance. At stage 410, a predicted performance measure of a content item eligible to be used in a content item selection process is obtained. The predicted performance measure can be obtained, for example, by a performance prediction component (e.g., performance prediction component 300 of FIG. 2). In various implementations, the predicted performance can be based on historical CTR, time of day, bidding information, budget information, budget information, predicted number of participants (e.g., constrained, unconstrained, or combinations thereof) in the auction, attributes of the property, expected impact of the content item on the selection process, probable discount price of the slot compared to a maximum bid, target demographic similarity to a query demographic, match type of keywords to a search query, an edit distance between keywords and terms of a search query, similarity of an advertisement vertical to a query vertical, a geographic distance between the advertiser and a user, or combinations thereof.

At stage 420, the predicted performance measure is compared to alternative predicted performance measures. The predicted performance measure can be compared to alternative predicted performance measures, for example, by a predicted performance comparator (e.g., predicted performance comparator 310 of FIG. 2). In various implementations, the predicted performance data can be compared to alternative predicted performance data and/or to threshold/scaling information. The comparison of the predicted performance data to alternative predicted performance data and/or threshold/scaling information can provide a relative indication of the importance that the advertisement participate in this auction in comparison to other auctions.

At stage 430, a participation probability is adjusted. The participation probability can be adjusted, for example, by a participation probability adjustment component (e.g., participation probability adjustment component 340 of FIG. 2). In some implementations, the participation probability can be adjusted based upon a particular range into which the comparison falls. In other implementations, the participation probability can be adjusted over a continuous spectrum of participation probabilities.

At stage 440, a determination of whether to include the content item in the selection process is made. The determination of whether to include the content item in the selection process can be made, for example, by a selection engine (e.g., selection engine 220 of FIG. 2). In some implementations, the selection can be made based upon selection of a random number and comparison of the random number to the participation probability.

Figure 3B:
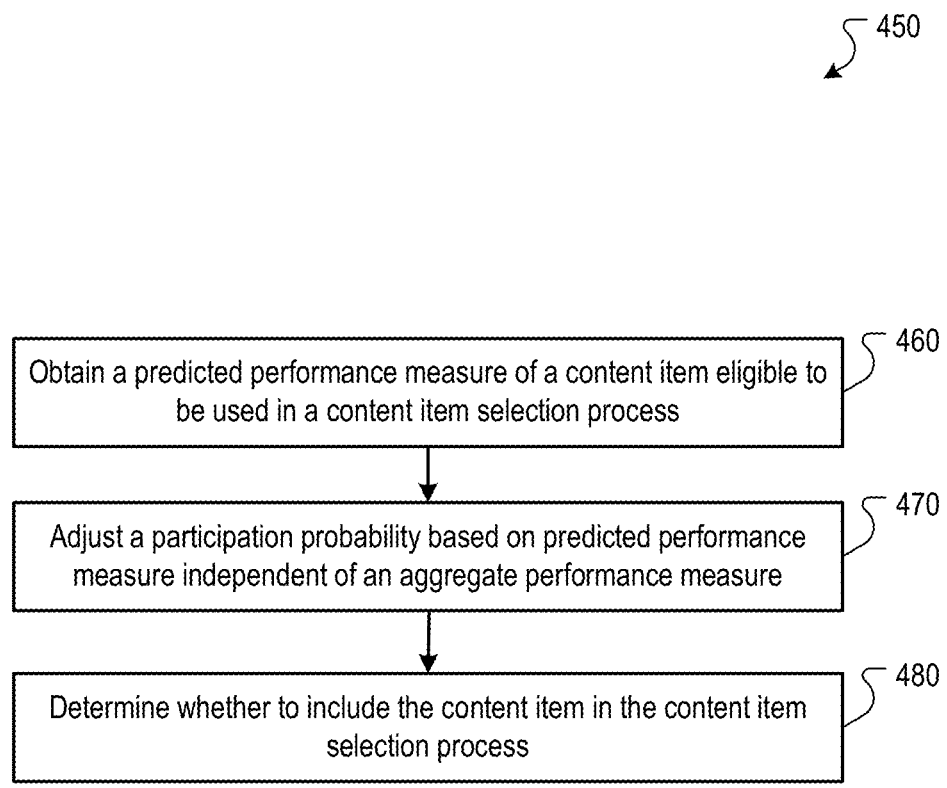

FIG. 3B is a flow diagram of an example process 450 for participation probability adjustment based on predicted performance. At stage 460, a predicted performance measure of a content item eligible to be used in a content item selection process is obtained. The predicted performance measure can be obtained, for example, by a performance prediction component (e.g., performance prediction component 300 of FIG. 2).

At stage 470, the participation probability is adjusted based on a predicted performance measure, independent of an aggregate performance measure. The adjustment of the participation probability can be made, for example, by a participation probability adjustment component (e.g., participation probability adjustment component 340 of FIG. 2). The participation probability is made independently of an aggregate performance measure, e.g., the average of historical performance measures. In some implementations, the participation probability is made adjusted based upon a comparison of the predicted performance to past predicted performance measures.

At stage 480, a determination of whether to include the content item in the content item selection process is made. The determination of whether to include the content item in the selection process can be made, for example, by a selection engine (e.g., selection engine 220 of FIG. 2). In some implementations, the selection can be made based upon selection of a random number and comparison of the random number to the participation probability.

§5.0 Example Computer System

Figure 4:
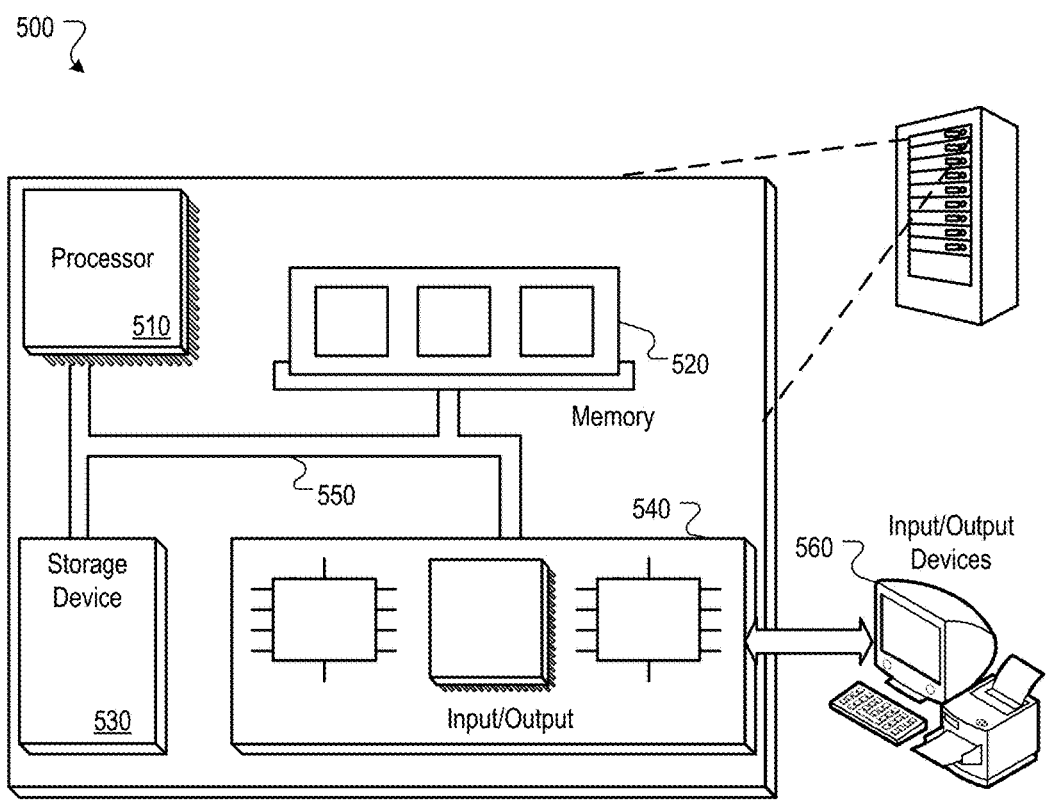
FIG. 4 is block diagram of an example computer system on which the participation probability adjustment subsystem can reside.

FIG. 4 is block diagram of an example computer system 500. The system 500 includes a processor 510, a memory 520, a storage device 530, and an input/output device 540. Each of the components 510, 520, 530, and 540 can, for example, be interconnected using a system bus 1350. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The participation probability adjustment subsystem 130 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The participation probability adjustment subsystem 130 can be distributively implemented over a network, such as a server farm, or can be implemented in a single computer device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
obtaining participation parameters for a content item that is eligible to be used in a content item selection process, a first set of the participation parameters being used to identify a first predicted performance of the content item in the content item selection process;
adjusting, by one or more computer processors, a participation probability associated with the content item based on a comparison of the first predicted performance with one or more second predicted performances of the content item, the participation probability identifying the probability that the content item will participate in the content item selection process, the adjusting being independent of an aggregate historical performance of the content item; and
determining whether to include the content item in the selection process based on the adjusted participation probability.

2. The method of claim 1, further comprising:
comparing the first predicted performance measure to one or more second predicted performances of the content item, each second predicted performance being based upon a second set of the participation parameters.

3. The method of claim 2, wherein comparing the first predicted performance to one or more second predicted performances comprises comparing a predicted discount associated with the content item selection process to one or more predicted discounts available from other content item selection processes for which the content item is eligible to be used.

4. The method of claim 2, wherein comparing the first predicted performance to one or more second predicted performances comprises comparing a statistical measure that a first campaign associated with the content item is likely to exhaust a first budget associated with the first campaign to a statistical measure than a related alternative campaign is likely to exhaust a second budget associated with the alternative campaign.

5. The method of claim 2, wherein comparing the first predicted performance to one or more second predicted performances comprises comparing predicted performance of the content item for a first web property to predicted performance measures of the content item with respect to one or more alternative web properties.

6. The method of claim 2, wherein comparing the first predicted performance to one or more second predicted performances comprises comparing a first expected revenue contribution for the content item in the content item selection process to one or more other expected revenue contributions associated with other content item selection processes.

7. The method of claim 2, wherein comparing the first predicted performance of the content item to one or more second predicted performances comprises identifying content item selection processes with fewer competitors.

8. The method of claim 2, wherein comparing the first predicted performance of the content item to one or more second predicted performances comprises identifying content item selection processes with fewer unconstrained competitors.

9. The method of claim 2, wherein the content item is an advertisement.

10. The method of claim 9, wherein the content item selection process is an automated auction that selects advertisements for presentation to a user, and the participation probability defines the probability that the advertisement is included in the automated auction.

11. The method of claim 2, wherein adjusting the participation probability comprises raising or lowering the participation probability by a discrete amount based upon ranges into which the first predicted performance lies.

12. The method of claim 2, wherein adjusting the participation probability comprises raising or lowering the participation probability over a continuous scale, the amount the participation probability is raised or lowered being a function of any variance in the first predicted performance.

13. The method of claim 1, further comprising identifying a geographic distance between an advertiser and a user device initiating in the content item selection process,
wherein adjusting the participation probability associated with the content item comprises:
increasing the participation probability associated with the content item in content item selection processes initiated by user devices within a first geographic distance of the advertiser; and
decreasing the participation probability associated with the content item in content item selection processes initiated by user devices outside of a second geographic distance of the advertiser.

14. The method of claim 1, further comprising identifying a match type between keywords associated with the content item and search terms used to initiate the content item selection process,
wherein adjusting the participation probability associated with the content item comprises:
increasing the participation probability associated with the content item in content item selection processes in which the match type is a close match; and
decreasing the participation probability associated with the content item in content item selection processes in which the match type is a broad match.

15. The method of claim 1, further comprising identifying an edit distance between a keyword associated with the content item and a search term used to initiate the content item selection process,
wherein adjusting the participation probability associated with the content item comprises:
increasing the participation probability associated with the content item in content item selection processes in which the edit distance is below a first threshold; and
decreasing the participation probability associated with the content item in content item selection processes in which the edit distance is above a second threshold.

16. The method of claim 1, further comprising identifying a proximity between a first vertical market segment associated with the content item and a second vertical market segment of a query initiating the content item selection process.

17. The method of claim 1, further comprising identifying proximity between a target demographic associated with the content item and a demographic associated with a query initiating the content item selection process.

18. The method of claim 1, wherein the content item is an advertisement.

19. The method of claim 18, wherein the selection process is an automated auction that selects advertisements for presentation to a user in response to a search query specified by the user, and the participation probability defines the probability that the advertisement is included in the automated auction.

20. The method of claim 1, wherein adjusting the participation probability comprises raising or lowering the participation probability a discrete amount variant based upon ranges into which the first predicted performance of the content item lies.

21. The method of claim 1, wherein adjusting the participation probability comprises raising or lowering the participation probability over a continuous scale, the amount the participation probability is raised or lowered being proportional to variance in the first predicted performance of the content item.

22. The method of claim 1, further comprising:
adjusting, by the one or more computer processors, the participation probability associated with the content item based on a time of day associated with the content item selection process, the adjusting based on the time of day associated with the content item selection process being independent of an aggregate historical performance of the content item.

23. The method of claim 1, wherein the participation parameters define one or more of a discount associated with the content item selection process, an expected revenue contribution of the content item in the content item selection process, a total number of competitors in the content item selection process, a number of unconstrained competitors in the content item selection process, a time of day associated with the content item selection process, geographic locations associated with the content item and content item selection process, attributes of the web property associated with the content item selection process, a campaign budget associated with the content item, a match type of keywords associated with the content item to the content item selection process, an edit distance between the content item selection process and keywords associated with the content item, a degree of similarity between a first vertical associated with the content item and a second vertical associated with the content item selection process, or a degree of similarity between a target demographic associated with the content item and a query demographic associated with the content item selection process.

24. Software stored in non-transitory computer readable media and comprising instructions executable by a processing device and upon such execution cause the processing device to perform operations comprising:

obtaining a predicted performance measure of a content item that is eligible to be used in the content item selection process;

comparing the predicted performance measure to one or more alternative predicted performance measures;

adjusting a participation probability associated with the content item based on comparing the predicted performance measure to one or more alternative predicted performance measures, the participation probability identifying the probability that the content item will participate in the content item selection process, the adjusting being independent of an aggregate historical performance of the content item; and determining whether to include the content item in the selection process based on the adjusted participation probability.

25. The software of claim 23, wherein the operations comprise:
adjusting the participation probability associated with the content item based on the predicted performance measure independent of an aggregate historical performance of the content item.

26. A system, comprising:
one or more data processors; and
instructions stored on a computer readable storage medium that when executed by the one or more data processors cause the one or more data processors to perform operations comprising:
obtaining participation parameters for a content item that is eligible to be used in a content item selection process, the participation parameters being used to identify a first predicted performance of the content item in the content item selection process;
adjusting, by one or more computer processors, a participation probability associated with the content item based on a comparison of the first predicted performance with a second predicted performance of the content item, the participation probability identifying the probability that the content item will participate in the content item selection process, the adjusting being independent of an aggregate historical performance of the content item; and
determining whether to include the content item in the selection process based on the adjusted participation probability.

* * * * *